United States Patent
Nammi et al.

(10) Patent No.: US 10,492,124 B2
(45) Date of Patent: *Nov. 26, 2019

(54) CONFIGURATION OF CODEWORD NUMBERS FOR 5G OR OTHER NEXT GENERATION NETWORK

(71) Applicant: AT&T Intellectual Property I, L.P., Atlanta, GA (US)

(72) Inventors: SaiRamesh Nammi, Austin, TX (US); Xiaoyi Wang, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/379,213

(22) Filed: Apr. 9, 2019

(65) Prior Publication Data
US 2019/0239143 A1    Aug. 1, 2019

Related U.S. Application Data

(63) Continuation of application No. 15/401,014, filed on Jan. 7, 2017, now Pat. No. 10,299,192.

(51) Int. Cl.
*H04W 48/12* (2009.01)
*H04B 7/0413* (2017.01)
(Continued)

(52) U.S. Cl.
CPC .......... *H04W 48/12* (2013.01); *H04B 7/0413* (2013.01); *H04B 7/0417* (2013.01);
(Continued)

(58) Field of Classification Search
CPC .. H04B 7/0456; H04B 7/0486; H04B 7/0632; H04B 17/24; H04B 17/336;
(Continued)

(56) References Cited

U.S. PATENT DOCUMENTS

| 7,593,486 B2 | 9/2009 | Jeong et al. |
| 7,813,458 B2 | 10/2010 | Van Waes et al. |

(Continued)

FOREIGN PATENT DOCUMENTS

| JP | 2014-075679 A | 4/2014 |
| WO | 2007/121568 A1 | 11/2007 |

(Continued)

OTHER PUBLICATIONS

Non-Final Office Action received for U.S. Appl. No. 15/401,014 dated Jun. 14, 2018, 35 pages.

(Continued)

*Primary Examiner* — Margaret G Mastrodonato
(74) *Attorney, Agent, or Firm* — Amin, Turocy & Watson, LLP

(57) ABSTRACT

Channel multi-input multi-output (MIMI) systems can be configured with a variable number of codewords where the network an change the number of codewords based on channel conditions, user equipment capability, etc. Thus, the network can efficiently utilize feedback channel overhead while simultaneously improving the capacity of the system. Instead of configuring the UE with a fixed number of codewords for all the channel conditions, the network can change the number of codewords dynamically or semi-statically. The network can determine the number of codewords based on measurements and recommendations from the UE. Alternatively, the network can determine the number of codewords on its own.

20 Claims, 12 Drawing Sheets

(51) Int. Cl.
*H04B 7/06* (2006.01)
*H04B 7/0417* (2017.01)
*H04W 76/27* (2018.01)
*H04W 12/02* (2009.01)
*H04L 5/00* (2006.01)

(52) U.S. Cl.
CPC ........... *H04B 7/0697* (2013.01); *H04L 5/006* (2013.01); *H04W 12/02* (2013.01); *H04W 76/27* (2018.02)

(58) Field of Classification Search
CPC .. H04B 7/0413; H04B 7/0417; H04B 7/0697; H04W 48/12; H04W 76/27; H04W 12/02; H04W 72/0413; H04W 72/048; H04W 76/046; H04L 5/006
See application file for complete search history.

(56) References Cited

U.S. PATENT DOCUMENTS

| | | | |
|---|---|---|---|
| 8,005,654 B2 | 8/2011 | Boldyrew et al. | |
| 8,094,761 B2 | 1/2012 | Zhang et al. | |
| 8,243,610 B2 | 8/2012 | Rong et al. | |
| 8,588,319 B2 | 11/2013 | Malladi et al. | |
| 8,750,150 B2 | 6/2014 | Zhang et al. | |
| 8,982,867 B2 | 3/2015 | Tang | |
| 8,982,973 B2 | 3/2015 | Chen et al. | |
| 9,184,817 B2 | 11/2015 | Wu et al. | |
| 9,225,478 B2 | 12/2015 | Chen et al. | |
| 9,344,172 B2 | 5/2016 | Nam | |
| 9,467,988 B2 | 10/2016 | Yin et al. | |
| 2008/0080641 A1 | 4/2008 | Kim | |
| 2011/0085507 A1 | 4/2011 | Jongren | |
| 2011/0103493 A1 | 5/2011 | Xia et al. | |
| 2012/0106470 A1 | 5/2012 | Clerckx et al. | |
| 2016/0065285 A1 | 3/2016 | Nammi | |
| 2016/0065289 A1 | 3/2016 | Zhao et al. | |
| 2016/0149626 A1 | 5/2016 | Frenne et al. | |
| 2016/0173244 A1 | 6/2016 | Ding | |
| 2016/0337056 A1 | 11/2016 | Frenne et al. | |

FOREIGN PATENT DOCUMENTS

| | | |
|---|---|---|
| WO | 2008/021062 A1 | 2/2008 |
| WO | 2010/023145 A1 | 3/2010 |
| WO | 2012/041107 A1 | 4/2012 |
| WO | 2012/043202 A1 | 4/2012 |

OTHER PUBLICATIONS

Zaire et al., "On the Capacity of Some Channels with Channel State Information," IEEE Transactions on Information Theory, vol. 45, No. 6, Sep. 1999, pp. 2007-2019.

| HARQ-ACK 802 | CSI 804 | Number of Codewords 806 | Layer Mapping 902 |

FIG. 9

CONFIGURATION OF CODEWORD NUMBERS FOR 5G OR OTHER NEXT GENERATION NETWORK

RELATED APPLICATION

The subject patent application is a continuation of, and claims priority to, U.S. patent application Ser. No. 15/401,014 (now U.S. Pat. No. 10,299,192), filed Jan. 7, 2017, and entitled "CONFIGURATION OF CODEWORD NUMBERS FOR 5G OR OTHER NEXT GENERATION NETWORK," the entirety of which application is hereby incorporated by reference herein

TECHNICAL FIELD

This disclosure relates generally to facilitating configuring a number of codewords. For example, this disclosure relates to facilitating a number of codewords within a network comprising multiple transmission and reception antennas for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption and lower latency than 4G equipment.

The above-described background relating to a non-orthogonal design is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 9 illustrates an example schematic system block diagram of a feedback channel structure for reporting a number of codewords and layer mapping according to one or more embodiments.

DETAILED DESCRIPTION

Figure 1:
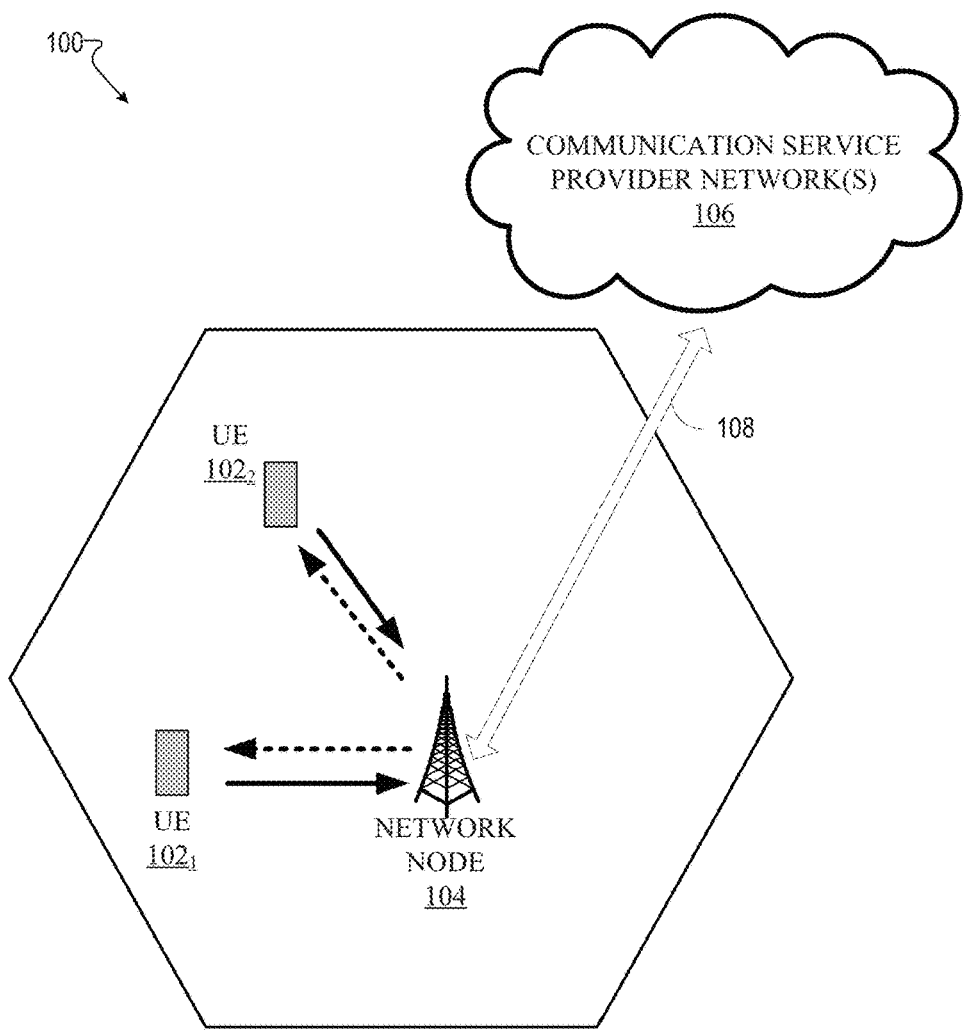
FIG. 1 illustrates an example wireless communication system in which a network node and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate a configuration of a number of codewords in a multi-antenna network for a 5G or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate configuration of a number of codewords in a multi-antenna network for a 5G network. Facilitating configuration of codewords for a 5G network can be implemented in connection with any type of device with a connection to the communications network (e.g., a mobile handset, a computer, a handheld device, etc.) any Internet of things (IOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, gNode B(gNB) network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

MIMO systems can significantly increase the data carrying capacity of wireless systems. For these reasons, MIMO is an integral part of the $3^{rd}$ and $4^{th}$ generation wireless systems. 5G systems will also employ MIMO systems also called massive MIMO systems (hundreds of antennas at the transmitter side and/or receiver side). Typically with a $(N_t,N_r)$, where $N_t$ denotes the number of transmit antennas and Nr denotes the receive antennas, the peak data rate multiplies with a factor of $N_t$ over single antenna systems in rich scattering environment.

Downlink reference signals are predefined signals occupying specific resource elements within a downlink time-frequency grid. There are several types of downlink reference signals that can be transmitted in different ways and used for different purposes by a receiving terminal. Channel state information reference signals (CSI-RS) can be used by terminals to acquire channel-state information (CSI) and beam specific information (e.g., beam reference signal received power). In 5G, CSI-RS can be user equipment (UE) specific so it can have a significantly lower time/frequency density. Demodulation reference signals (DM-RS), also sometimes referred to as UE-specific reference signals, can be used by terminals for channel estimation of data channels. The label "UE-specific" relates to the each demodulation reference signal being intended for channel estimation by a single terminal. The demodulation reference signal can then be transmitted within the resource blocks assigned for data traffic channel transmission to that terminal. Other than the aforementioned reference signals, there are other reference signals, namely multi-cast broadcast single frequency network (MBSFN) and positioning reference signals that can be used for various purposes.

An uplink control channel can carry information about hybrid automatic repeat request acknowledgment (HARQ-ACK) corresponding to a downlink data transmission, and channel state information. The channel state information can comprise rank indicator (RI) data, channel quality indicator (CQI) data, and pre-coding matrix indicator (PMI) data.

The physical downlink control channel (PDCCH) can carries information about scheduling grants. Typically this can comprise a number of multiple-input multiple-output (MIMO) layers scheduled, transport block sizes, modulation for each codeword, parameters related to HARQ, sub band locations, and also PMI data corresponding to the sub bands. It should be understood that, all downlink control channel (DCI) formats may not transmit all the information. However, the contents of the PDCCH can depend on a transmission mode and the DCI format.

Figure 6:
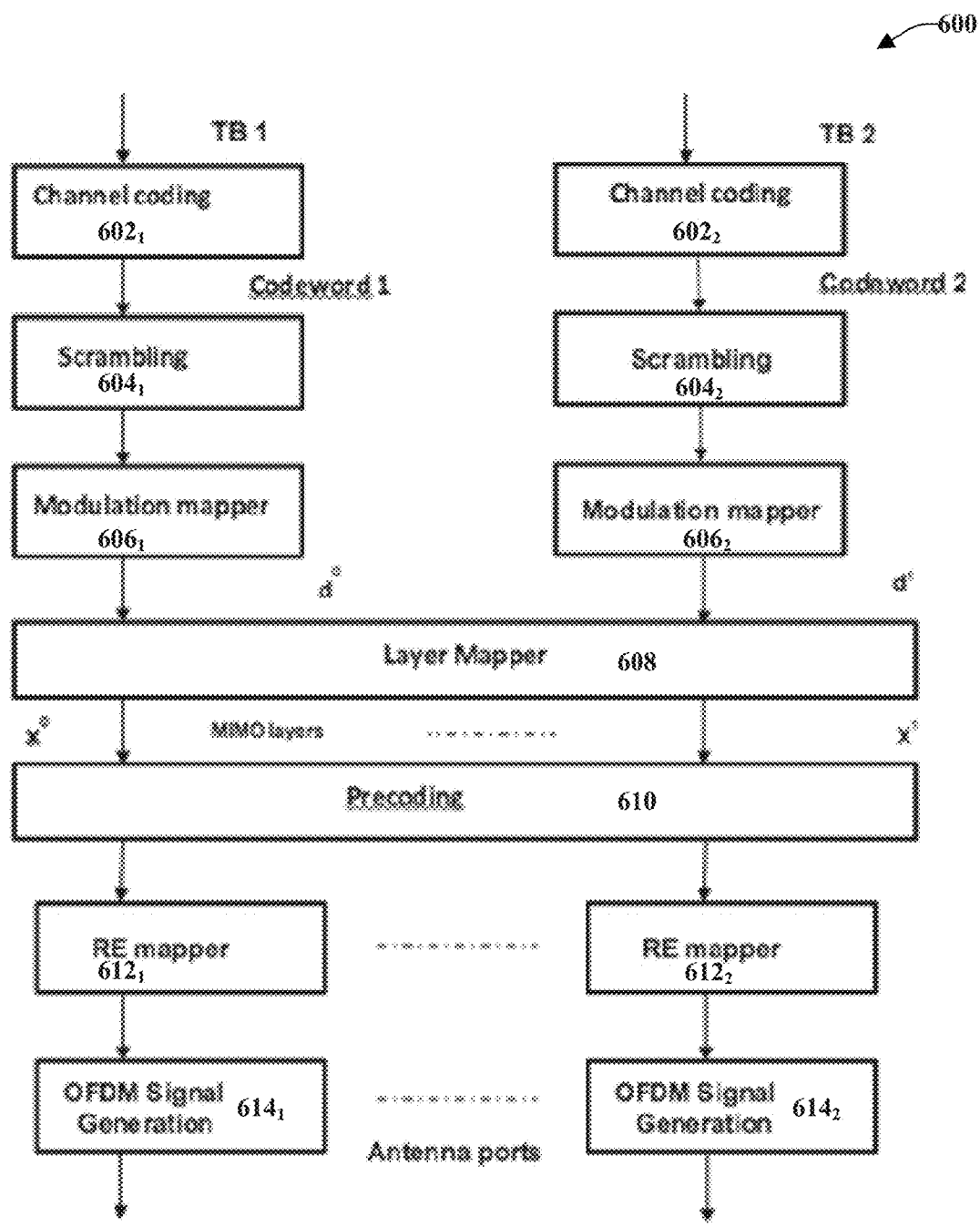
FIG. 6 illustrates an example schematic system block diagram of a general structure of an LTE downlink MIMO transmission with two codewords.

Within multi-codeword MIMO, the feedback channel (both downlink and uplink) overhead can be proportional to a transmission rank. For example, if the UE reported a rank is equal to 4, then the network needs to report 4 channel quality indicators. Similarly, the transmitter can transmit 4 transport block sizes, a modulation format, HARQ process numbers, redundancy versions, etc. Consequently, the feedback channel overhead is proportional to the transmission rank. To reduce the overhead, a codeword dimensioning principle can bundle the layers and supporting codewords. The codeword can be defined as an information block appended with a cyclic redundancy check (CRC). Each codeword can be separately coded using turbo coding and the coded bits from each codeword can be scrambled separately as shown in FIG. 6. The complex-valued modulation symbols for each of the codewords to be transmitted can be mapped onto one or multiple layers.

The complex-valued modulation symbols for codeword q can be represented by Equation 1:

$$d^{(q)}(0), \ldots, d^{(q)}(M^{(q)}_{symb}-1), \quad \text{Equation 1:}$$

Figure 2:
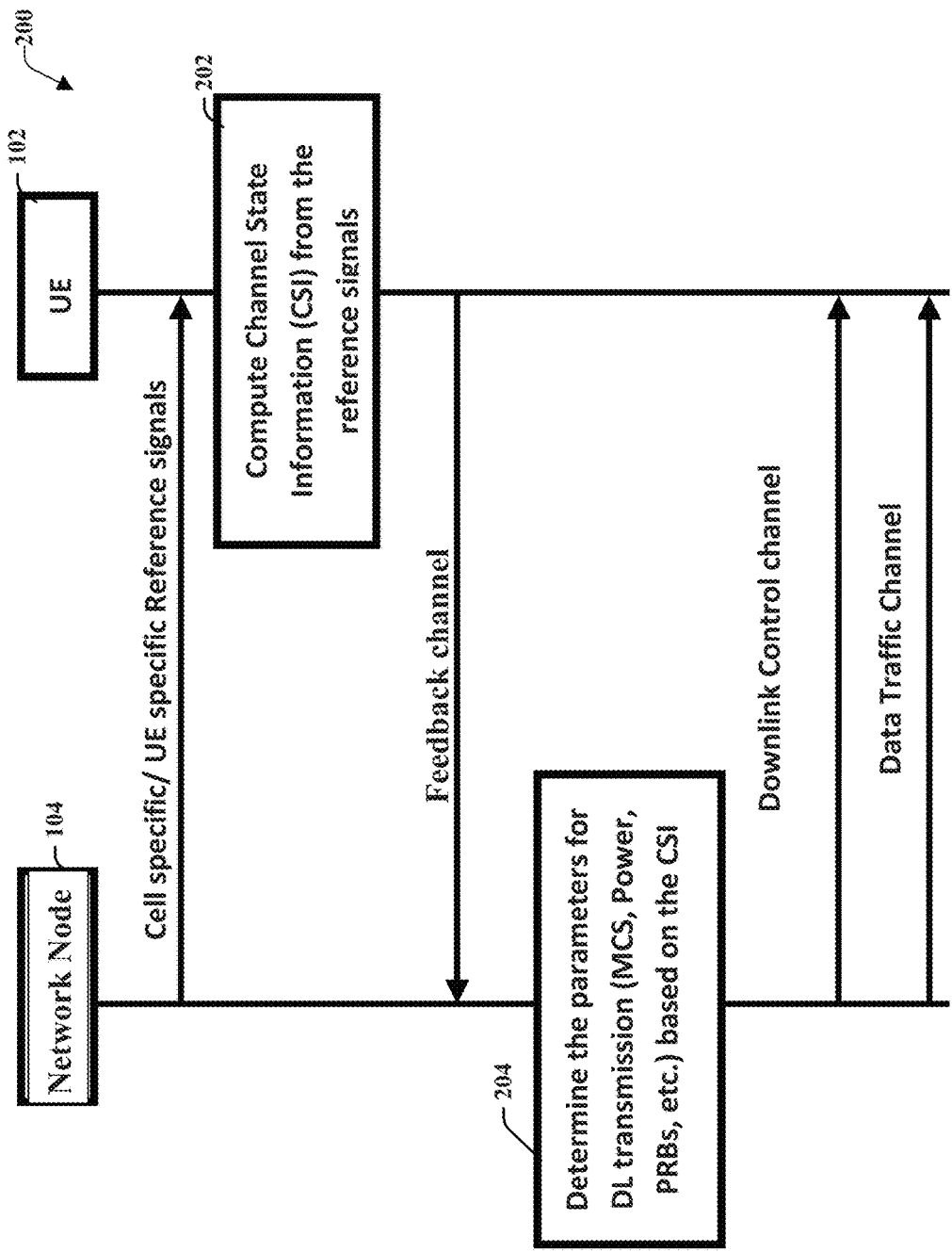
FIG. 2 illustrates an example schematic system block diagram of a message sequence chart between a network node and UE according to one or more embodiments.

Equation 1 can be mapped onto the layers as represented by Equation 2:

$$x(i)=[x^{(0)}(i) \ldots x^{(v-1)}(i)]^T, i=0,1,\ldots,M^{layer}_{symb}-1, \quad \text{Equation 2:}$$

where v is the number of layers and $M^{layer}_{symb}$ is the number of modulation symbols per layer. The codeword-to-layer mapping is shown in FIG. 2. Consequently whenever the transmission rank is more than a predefined number, the transport block size can increase to accommodate the number of bits.

The MIMO systems can be configured with a variable number of codewords whereby the network changes the number of codewords based on channel conditions, UE capability, etc. Consequently, the network can utilize the feedback channel overhead simultaneously to improve the capacity of the system, resulting in significant gains in sector throughput and cell edge user throughput and reduction in feedback channel overhead. Instead of configuring the UE with a fixed number of codewords for all the channel conditions, the network can change the number of codewords dynamically or semi-statically. The network can decide the number of codewords based on measurements and recommendations from the UE, or the network can decide on its own. For example at time T1, the network can configure the UE with two codewords; and at time T2, the network can configure the UE with a single codeword; and at time T3, the network can configure the UE with three codewords. By dynamically configuring the UE with codewords, the number of codewords can be adapted based on channel conditions, and the feedback signal overhead can scale accordingly.

In one embodiment, the number of codewords can be determined without UE assistance. The network can determine the number of codewords autonomously without UE assistance. For example, if the UE is configured with two codeword MIMO, then the UE can report two CQIs. If the network observed that the two CQIs are equal, or substantially equal, or the difference between CQIs is less than a pre-defined threshold, then the network can determine that the corresponding UE can use a single codeword.

Once the network determines the number of codewords, the UE needs to know the number of codewords prior to decoding the data traffic channel. Therefore, the network can convey the number of codewords to the UE. In one embodiment, the network can convey this information as part of the downlink control channel. Consequently, the UE can decode the DCI and decode the data channel. In another embodiment, the network can configure the UE with radio resource control (RRC) signaling associated with the number of codewords until the RRC re-configuration.

The basic function of a rate matching module is to match the number of bits in a transport block (TB) to the number of bits that can be transmitted in the given allocation. Rate matching can comprise sub-block interleaving, bit collection, and pruning. In PDSCH, rate matching can be performed by the PDSCH TB being segmented into code blocks (CB) if its size is greater than 6144 bits. Otherwise there can be no segmentation of the TB, but the TB and CB can be of same size. Rate matching can be performed over code blocks and performed after the code blocks have undergone turbo encoding. The turbo encoder can perform a ⅓ rate encoding. For example, for every single input bit, 3 output bits can be provided in which the first bit is the original input bit called as a systematic bit, and the remaining two bits can be an interleaved version of the input bit called parity1 and parity2 bits. These three streams of systematic, parity1, and parity2 bits can be fed as input to a rate matching module.

In one embodiment, described herein is a method comprising configuring a mobile device of a wireless network according to a first number of codewords. The method can also comprise receiving a signal transmission from the mobile device, wherein the signal transmission comprises channel data associated with a channel state of the mobile device. Thus, in response to receiving the signal transmission, the method can comprise configuring the mobile device according to a second number of the codewords different than the first number.

According to another embodiment, a system can facilitate, receiving a reference signal associated with channel state data of a first channel between a mobile device and a network device. Based on the channel state data, the system can facilitate, generating channel estimation data associated with the first channel, and based on the channel estimation data, the system can facilitate generating signal interference data, representative of a first signal to noise plus interference ratio of a first layer of the first channel. Thereafter the system can compare the first signal to noise plus interference ratio to a second signal to noise plus interference ratio of a second layer of a second channel between the mobile device and the network device, resulting in signal to noise plus interference ratio comparison data, and in response to the comparing, the system can send the signal to noise plus interference ratio comparison data to the network device.

According to yet another embodiment, described herein is a machine-readable storage medium that can perform the operations comprising receiving a first signal transmission from a mobile device, wherein the first signal transmission comprises an indication that the mobile device is configured with a first number of codewords. The operations can also comprise analyzing the first signal transmission, wherein the first signal transmission comprises a quality difference metric indicative of the first number of codewords being less than a predefined number associated with a quality difference. In response to the analyzing, the operations can comprise facilitating use of a second number of the codewords different from the first number of the codewords.

These and other embodiments or implementations are described in more detail below with reference to the drawings.

FIG. 1 illustrates an example wireless communication system 100 in accordance with various aspects and embodiments of the subject disclosure. In example embodiments, system 100 is or comprises a wireless communication network serviced by one or more wireless communication network providers. In example embodiments, system 100 can comprise one or more user equipment (UEs) 102 (e.g., 102$_1$, 102$_2$ . . . 102$n$), which can comprise one or more antenna panels comprising vertical and horizontal elements. A UE 102 can be any user equipment device, such as a mobile phone, a smartphone, a cellular enabled laptop (e.g., comprising a broadband adapter), a tablet computer, a wearable device, a virtual reality (VR) device, a heads-up display (HUD) device, a smart car, a machine-type communication (MTC) device, and the like. UE 102 can also comprise IOT devices that can communicate wirelessly. UE 102 roughly corresponds to the mobile station (MS) in global system for mobile communications (GSM) systems. Thus, the network node 104 (e.g., network node device) can provide connectivity between the UE and the wider cellular network and can facilitate wireless communication between the UE and the wireless communication network (e.g., the one or more communication service provider networks 106, described in more detail below) via a network node 104. The UE 102 can send and/or receive communication data wirelessly to the network node 104. The dashed arrow lines from the network node 104 to the UE 102 represent downlink (DL) communications and the solid arrow lines from the UE 102 to the network nodes 104 represent uplink (UL) communications.

The non-limiting term network node (e.g., network node device) can be used herein to refer to any type of network node serving a UE 102 and/or connected to other network nodes, network elements, or another network node from which the UE 102 can receive a radio signal. In typical cellular radio access networks (e.g., universal mobile telecommunications system (UMTS) networks), they can be referred to as base transceiver stations (BTS), radio base station, radio network nodes, base stations, NodeB, eNodeB (e.g., evolved NodeB), etc.). In 5G terminology, the node can be referred to as a gNodeB (e.g., gNB) device. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network node 104) can include but are not limited to: NodeB devices, base station (BS) devices, access point (AP) devices, and radio access network (RAN) devices. The network node 104 can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like.

System 100 can further comprise one or more communication service provider networks 106 that facilitate providing wireless communication services to various UEs, comprising UE 102, via the network node 104 and/or various additional network devices (not shown) included in the one or more communication service provider networks 106. The one or more communication service provider networks 106 can include various types of disparate networks, comprising: cellular networks, femto networks, picocell networks, microcell networks, internet protocol (IP) networks Wi-Fi service networks, broadband service network, enterprise networks, cloud based networks, and the like. For example, in at least one implementation, system 100 can be or can comprise a large scale wireless communication network that spans various geographic areas. According to this implementation, the one or more communication service provider networks 106 can be or can comprise the wireless communication network and/or various additional devices and components of the wireless communication network (e.g., additional network devices and cells, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

In one technique, the UE 102 can send a reference signal back to the network node 104. The network node 104 takes a received reference signal from the UE 102, estimates the condition of the channel, which can be influenced by various factors, such as objects in the line of sight, weather, movement, interference, etc., and after correcting for more issues (e.g., interference), adjusts the beamforming rates for each antenna transmitting to the UE 102, and changes parameters, so as to transmit a better beam toward the UE 102. This ability to select MIMO schemes and use beamforming to focus energy and adapt to changing channel conditions can allow for higher data rates.

Referring now to FIG. 2, illustrated is an example schematic system block diagram of a message sequence chart between a network node and user equipment according to one or more embodiments. FIG. 2 depicts a message sequence chart for downlink data transfer in 5G systems 200. The network node 104 can transmit reference signals to a user equipment (UE) 102. The reference signals can be cell specific and/or user equipment 102 specific in relation to a profile of the user equipment 102 or some type of mobile identifier. From the reference signals, the user equipment 102 can compute channel state information (CSI) and compute parameters needed for a CSI report at block 202. The CSI report can comprise: a channel quality indicator (CQI), a pre-coding matrix index (PMI), rank information (RI), a CSI-resource indicator (e.g., CRI the same as beam indicator), etc.

The user equipment 102 can then transmit the CSI report to the network node 104 via a feedback channel either on request from the network node 104, a-periodically, and/or periodically. A network scheduler can leverage the CSI report to determine downlink transmission scheduling parameters at block 204, which are particular to the user equipment 102. The scheduling parameters at block 204 can comprise modulation and coding schemes (MCS), power, physical resource blocks (PRBs), etc. FIG. 2 depicts the physical layer signaling where the density change can be reported for the physical layer signaling or as a part of the radio resource control (RRC) signaling. In the physical layer, the density can be adjusted by the network node 104 and then sent over to the user equipment 102 as a part of the downlink control channel data. The network node 104 can transmit the scheduling parameters, comprising the adjusted densities, to the user equipment 102 via the downlink control channel. Thereafter and/or simultaneously, data can be transferred, via a data traffic channel, from the network node 104 to the user equipment 102.

Figure 3:
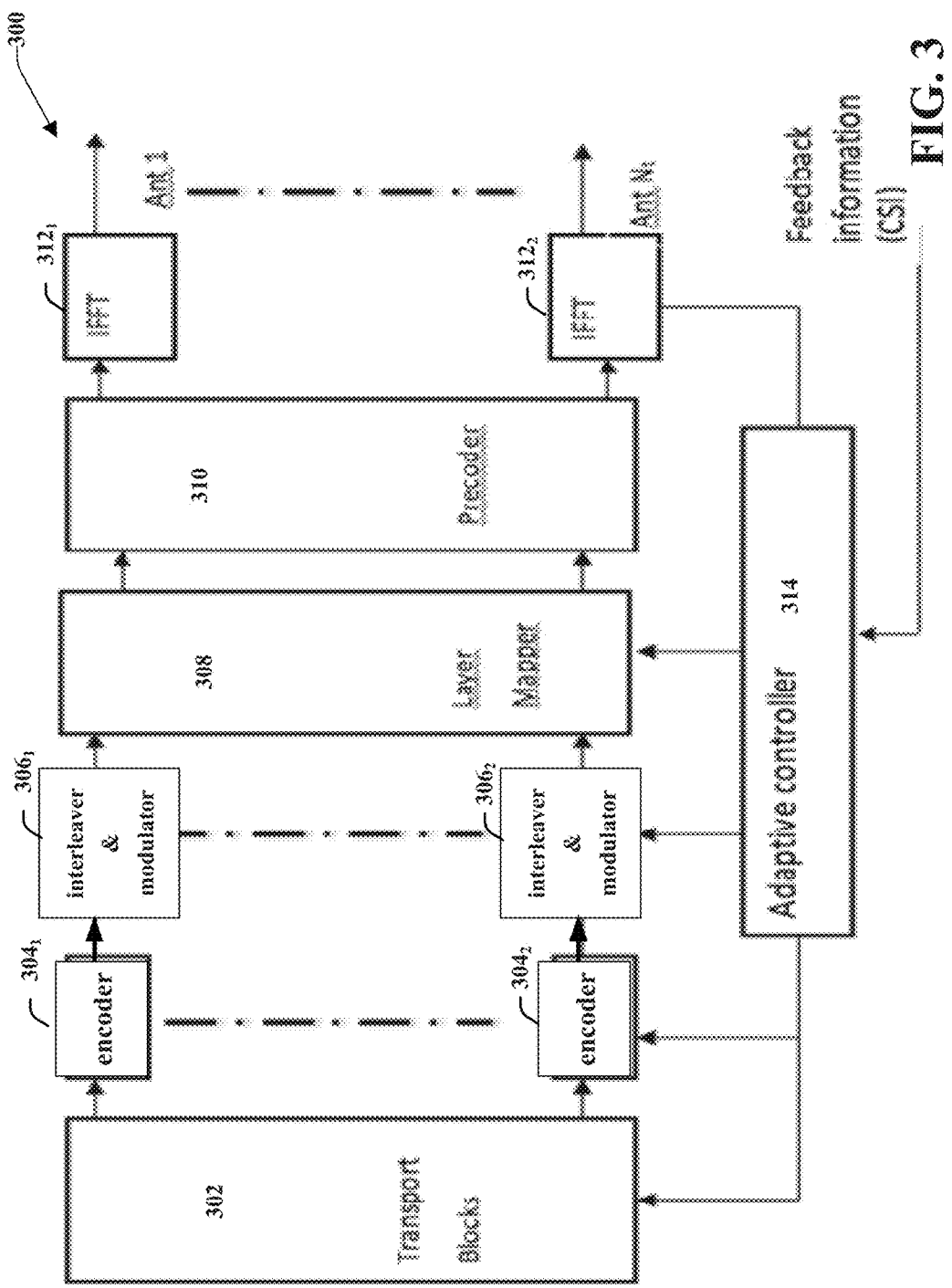
FIG. 3 illustrates an example schematic system block diagram of a multiple code word MIMO transmitter.

Referring now to FIG. 3, illustrated is an example schematic system block diagram of a multiple code word MIMO transmitter. FIG. 3 depicts the transmission side of a MIMO communication system 300 with $N_t$ transmit antennas. There are Nc transport blocks 302, where Nc<=Nt (e.g., the maximum number of transport blocks can be less than the maximum number of transport antennas). CRC bits can be added to each transport block 302 and passed to the channel encoder $304_1$, $304_2$. The channel encoder can add parity bits to protect the data. Then, the stream can be passed through an interleaver & modulator $306_1$, $306_2$. The interleaver can re-arrange the bit positions and the modulator can maps the bits to symbols in a constellation. The interleaver size can be adaptively controlled by an adaptive controller 314 by puncturing (e.g., removing bits in the coded stream, also called rate matching) to increase the data rate. The adaptation can be done by using the information from the feedback channel (e.g., channel state information sent by the receiver). The interleaved data can be passed through a symbol mapper (e.g., modulator) at the interleaver & modulator $306_1$, $306_2$ block. The symbol mapper can also be controlled by the adaptive controller 314. Afterwards the modulator streams can be passed through a layer mapper (e.g. the block where the coded bits are mapped to the number antennas) 308 and a precoder 310. The precoder 310 can generalize any beamforming to support multi-stream transmission the MIMO network. The resultant streams can then be passed through an inverse fast fourier transform (IFFT) $312_1$, $312_2$ block. It should be understood that the IFFT $312_1$, $312_2$ block can facilitate some communication systems, which implements OFDMA as the access technology (e.g., 5G, LTE/LTE-A), and in other systems it can be different and can be dependent on the multiple access system. The encoded stream can then be transmitted through a respective antenna.

Figure 4:
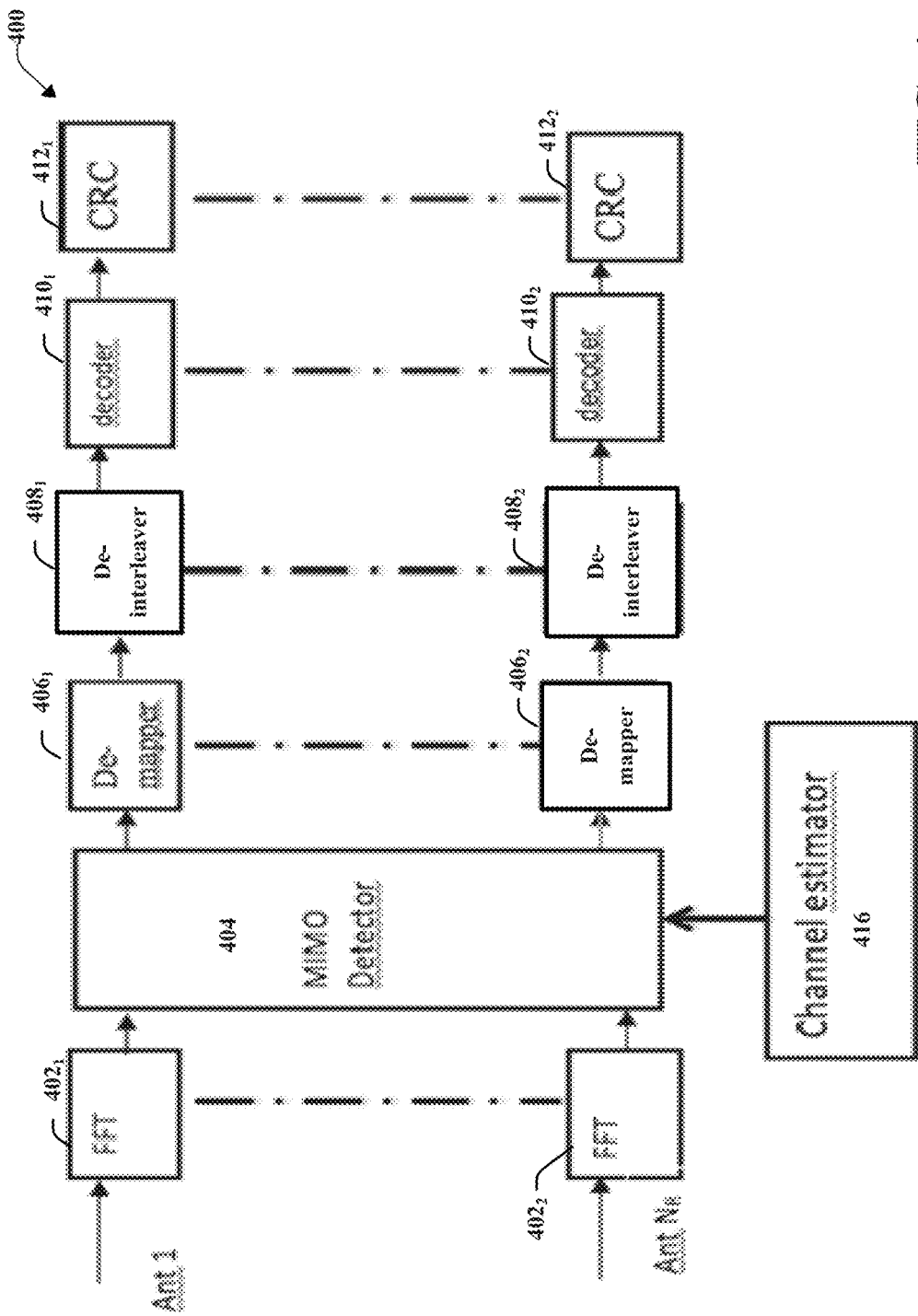
FIG. 4 illustrates an example schematic system block diagram of a multiple codeword MIMO receiver without codeword interference cancellation.

Referring now to FIG. 4, illustrated is an example schematic system block diagram of a multiple codeword MIMO receiver without codeword interference cancellation. FIG. 4 depicts the receiver for the multiple codeword MIMO system 400 without interference cancellation. After a fast fourier transform (FFT) operation $402_1$, $402_2$, a MIMO detector 404 can be used for reducing multi-antenna interference. A de-mapper $406_1$, $406_2$ can compute the bit log likelihood ratios from the MIMO detector 404 output, which can be in the symbol domain. A channel estimator 416 can estimate channels and then the MIMO detector 404 can use the estimated channels to generate a weight of a minimum mean square error estimation (MMSE) detector. The bit stream can then be de-interleaved by a de-interleaver $408_1$, $408_2$ block and passed to a channel decoder $410_1$, $410_2$. A CRC check can be performed on an output of the channel decoder $410_1$, $410_2$ at a CRC $412_1$, $412_2$ block. If the CRC is passed, a transport block can be considered to be passed, and an ACK can be sent back to a transmitter via a feedback channel. If the CRC fails, then a negative acknowledgment (NAK) can be sent back to the transmitter using the feedback channel.

Figure 5:
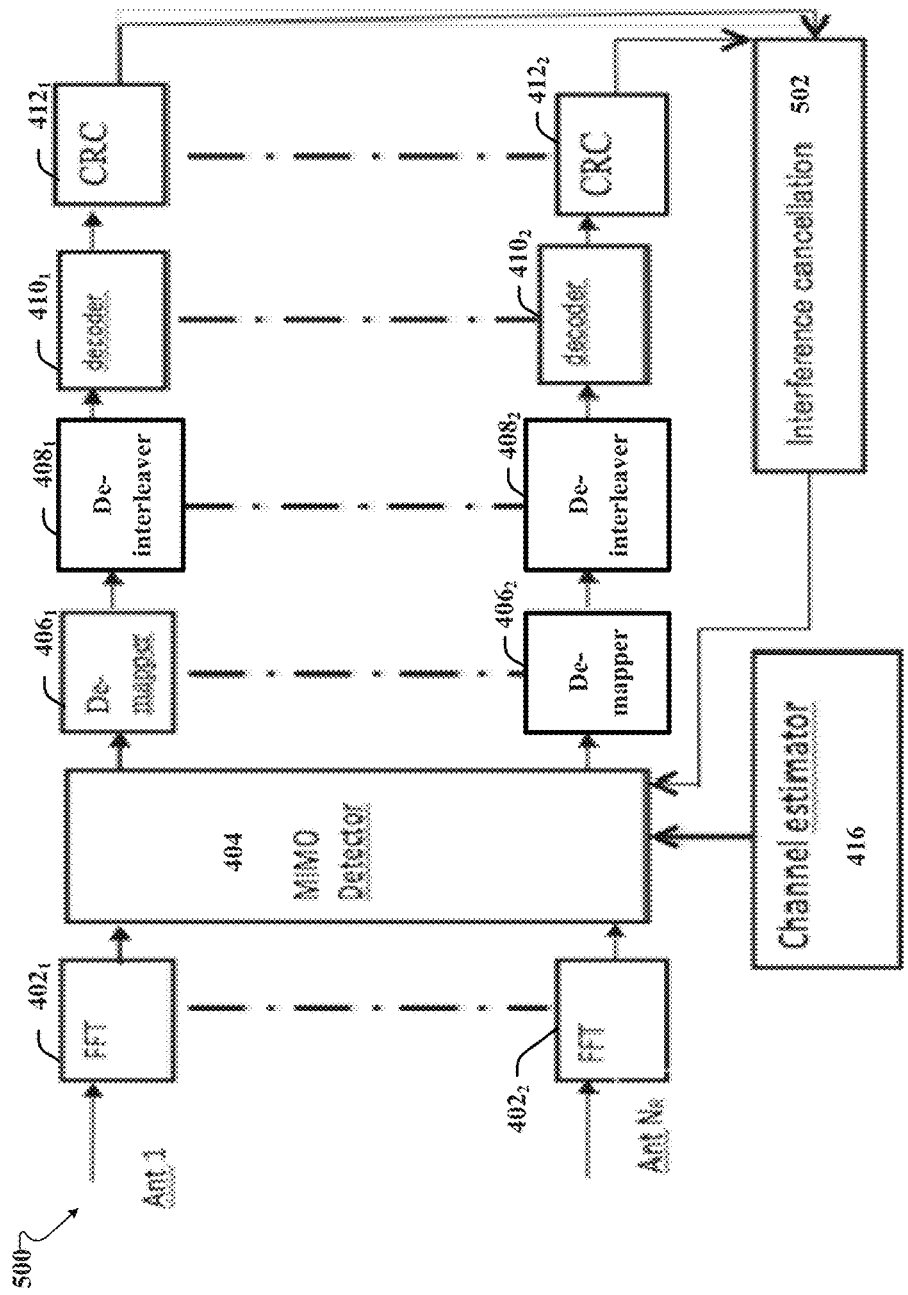
FIG. 5 illustrates an example schematic system block diagram of a multiple codeword MIMO receiver comprising codeword interference cancellation.

Referring now to FIG. 5 illustrates an example schematic system block diagram of a multiple codeword MIMO receiver comprising codeword interference cancellation. FIG. 5 depicts the MIMO receiver with codeword interference cancellation 500, also called serial interference cancellation (SIC), where all of the receiver codewords can be decoded simultaneously. Once the CRC check is performed on the codewords, the codewords whose CRC is a pass can be reconstructed and subtracted from the received signal via an interference cancellation block 502 and only those codewords whose CRC is a fail can be decoded. This process can be repeated until all of the codewords are passed, or all of the codewords are failed, or a certain predetermined number of iterations are reached.

Figure 7:
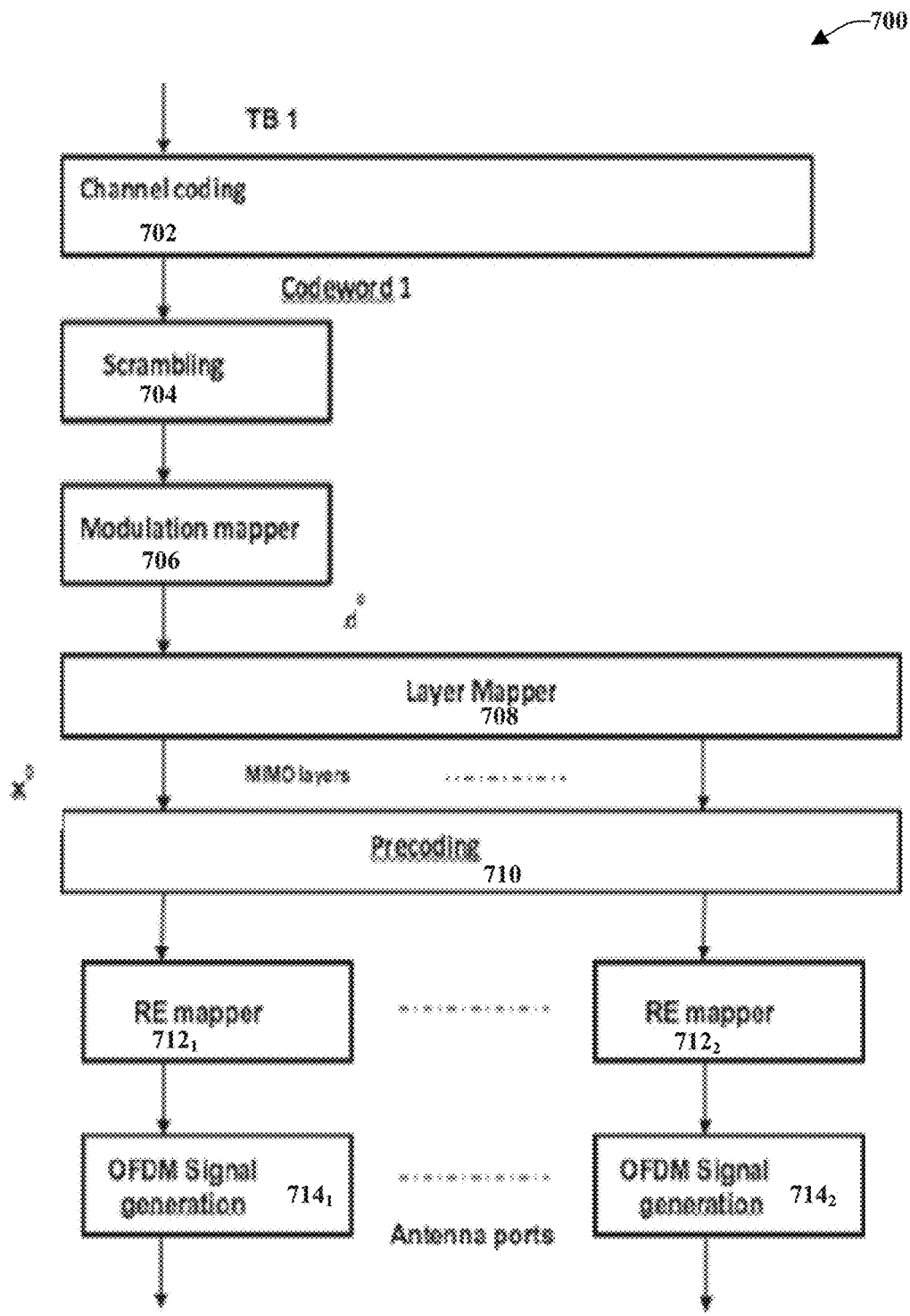
FIG. 7 illustrates an example schematic system block diagram of a general structure of a new radio downlink MIMO transmission with a single codeword.

Referring now to FIG. 6, illustrated is an example schematic system block diagram of a general structure of an LTE downlink MIMO transmission with two codewords 600. Transmissions TB1 (for a first codeword) and TB2 (for a second codeword) can both experience channel coding, scrambling, and modulation mapping at channel coding blocks $602_1$, $602_2$, scrambling blocks $604_1$, $604_2$, and modulation mapper blocks $606_1$, $606_2$, respectively. Once layer mapping is complete via a layer mapper block 608, the resultant symbols can be precoded, via a precoding block 610, using a selected precoder. The precoded symbols can then be mapped, via RE mapper $612_1$, $612_2$ to resource elements in an OFDM time frequency grid and OFDM signals can be generated via OFDM signal generation blocks $614_1$, $6124_2$. The resulting signal can be passed to the antenna ports. Since improving signaling efficiency is pillar of 5G systems, assuming a single codeword MIMO is an attractive option for 5G NR systems to extend an LTE codeword dimensioning principle to a single codeword, rather than to two codewords as shown in FIG. 7. A new layer mapping table, for example, a serial to parrallel converter, can be used.

Referring now to FIG. 7, illustrated is an example schematic system block diagram of a general structure of a new radio downlink MIMO transmission with a single codeword 700. Another variant of single codeword MIMO where the multiple transport blocks belong to same HARQ process identifier or codeword can also be used as a single codeword MIMO structure.

Figure 8:
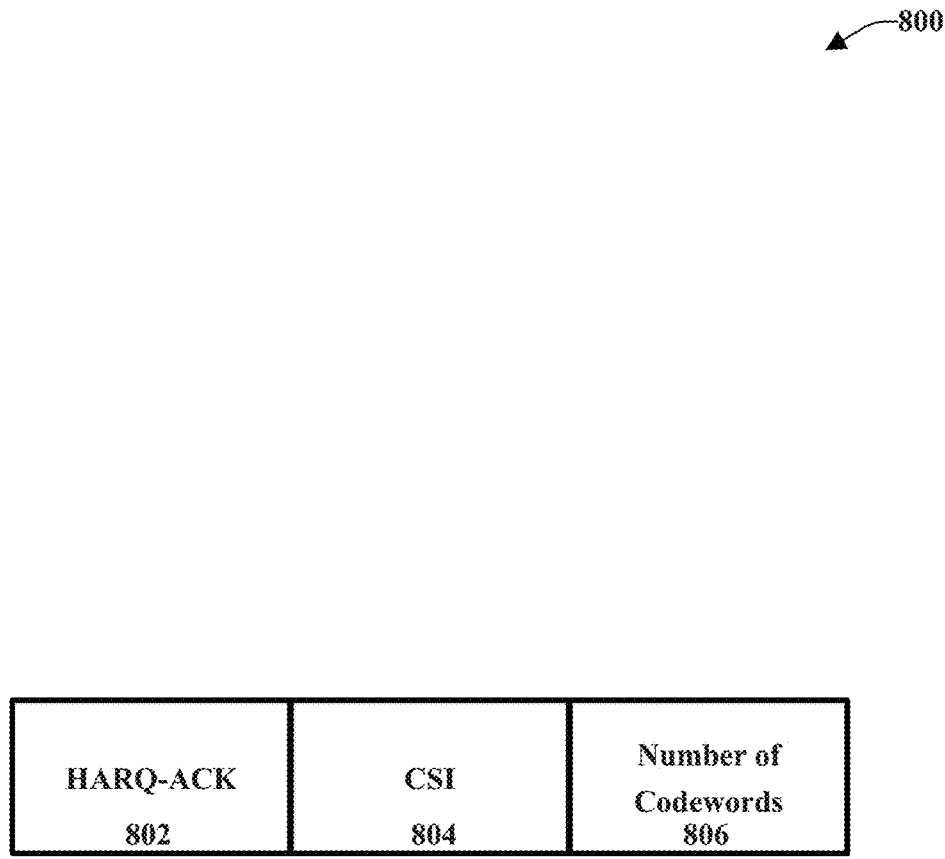
FIG. 8 illustrates an example schematic system block diagram of a feedback channel structure for reporting a number of codewords.

Referring now to FIG. 8, illustrated is an example schematic system block diagram of a feedback channel structure 800 for reporting a number of codewords. In this embodiment, the network node 104 can determine the number of codewords from the UE 102 recommendation (e.g., the UE explicitly recommends the number of codewords). This can be reported as part of the uplink control channel information where it reports a HARQ-Ack 802, a CSI 804, and a number of codewords 806. To facilitate the aforementioned embodiment, the UE 102 can determine the number of codewords when reporting the CSI to the network. Since the UE 102 can estimate the channel from the CSI-RS, it can estimate the SINR of the each layer and then determine if the SINR of the layers are almost equal, or substantially equal, or if there is a difference between the layers. For example, for a 4 antenna port system SINR1, SINR2, SINR3, and SINR4 can be the corresponding SINR of each layer. However, if SINR1-SINR3, SINR1-SINR2, SINR1-SINR4 is less than Delta, where the Delta is a pre-defined number, then the system can choose a single codeword and report the codeword to the network.

Referring now to FIG. 9, illustrates an example schematic system block diagram of a feedback channel structure for reporting a number of codewords and layer mapping 900. In another embodiment, the UE 102 can measure the SINR and compare to the layer mapping table at a layer mapping block 902 if the number of codewords is greater than 1 to indicate which layers need to be coupled to form a codeword.

Figure 10:
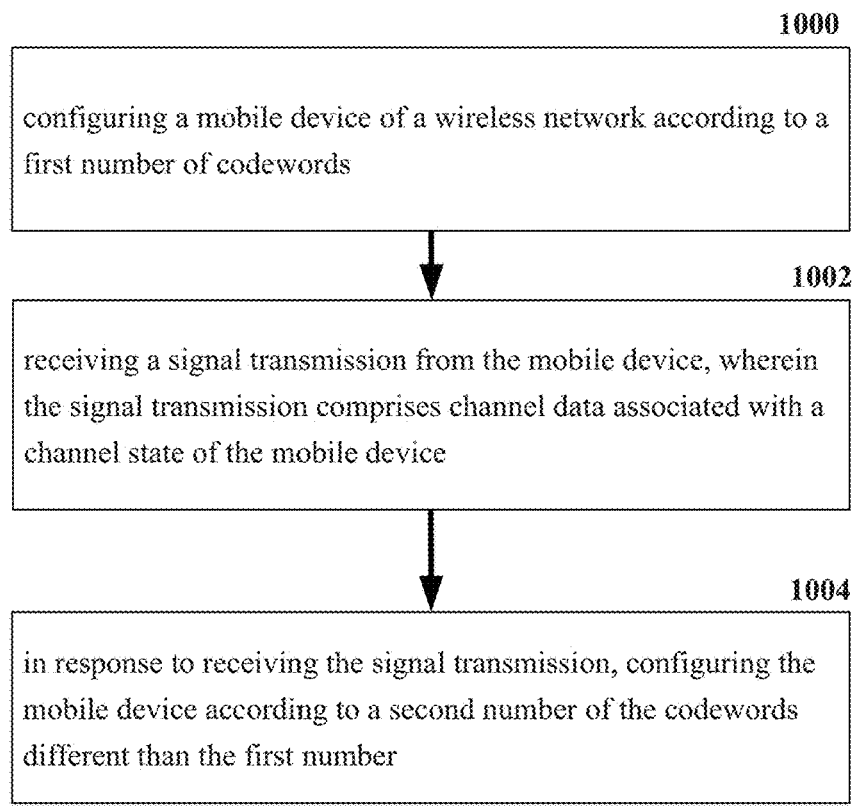
FIG. 10 illustrates an example flow diagram for configuring codewords according to one or more embodiments.

Referring now to FIG. 10, illustrated is an example flow diagram for configuring codewords. At element 1000, a network device (e.g., network node 104) can configure a mobile device (e.g., UE 102) of a wireless network according to a first number of codewords. At element 1002, the network device (e.g., network node 104) can receive a signal transmission from the mobile device (e.g., UE 102), wherein the signal transmission comprises channel data associated with a channel state of the mobile device (e.g., UE 102). In response to receiving the signal transmission, the network device (e.g., network node 104) can configure the mobile device (e.g., UE 102) according to a second number of the codewords different than the first number at element 1004.

Figure 11:
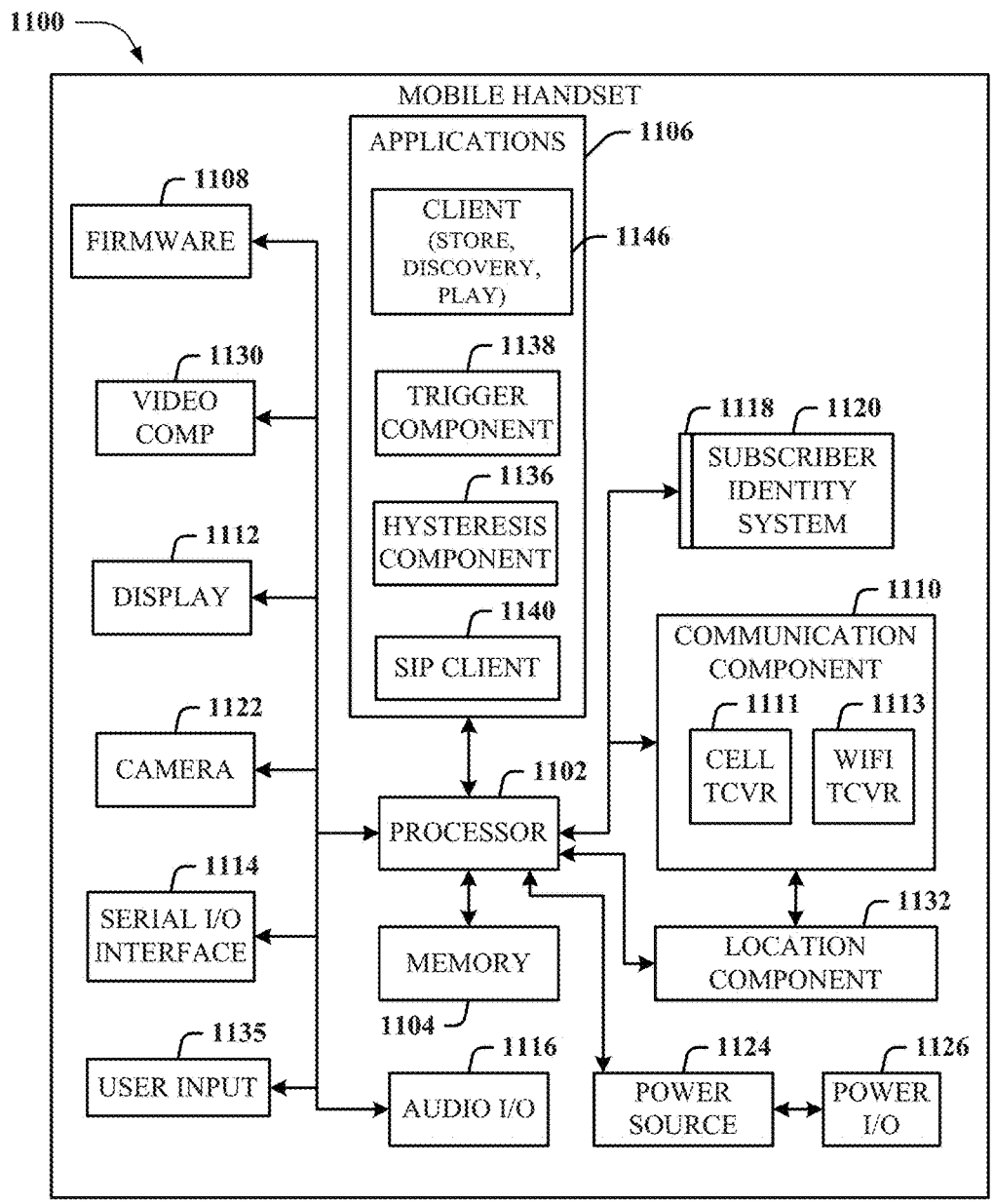
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
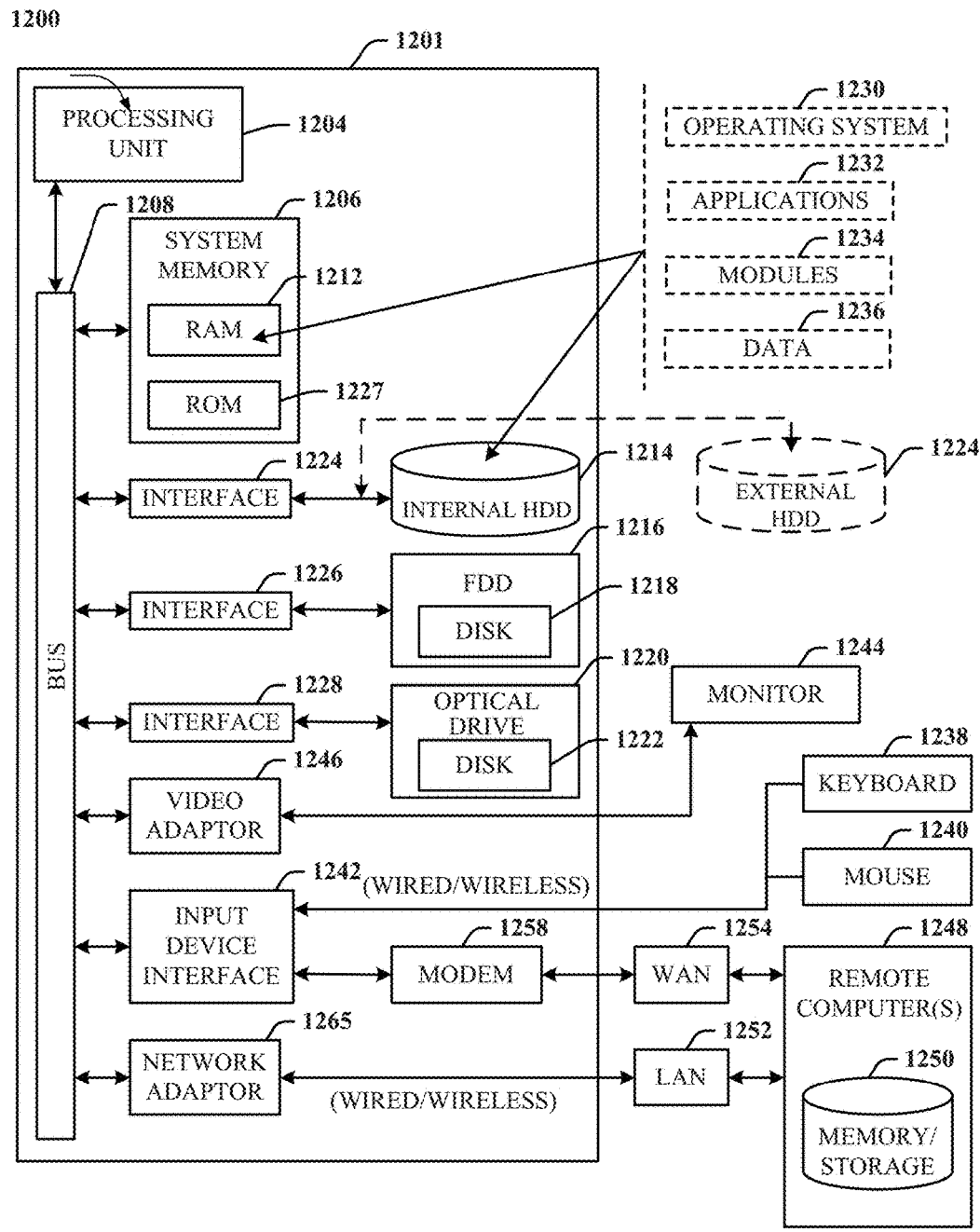
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The feedback signaling overhead can be reduced when MIMO codeword dimensioning is applied. However the drawback with codeword dimensioning is that the link throughput is impacted as the MIMO layers with different channel qualities are coupled as codewords. For example consider the case of the single codeword MIMO with 8 antenna ports. Then the UE needs to report the channel quality corresponding to the layer, which has the lowest SINR. Although the other layers have high SINR, the codeword dimensioning prevents scheduling of higher modulation and code rate or transport block size corresponding to their SINR. This results in loss in link throughput. Hence a solution is needed to improve the link throughput or capacity while simultaneously reducing the signaling overhead of the feedback channel.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    receiving, by a network device comprising a processor, a first signal transmission from a mobile device, wherein the first signal transmission comprises channel data associated with a channel state of the mobile device, and wherein the first signal transmission comprises codeword recommendation data representative of a codeword recommendation for a first number of codewords from the mobile device; and in response to the receiving the first signal transmission, configuring, by the network device, the mobile device according to the first number of the codewords different than a second number of the codewords associated with a previous configuration of the mobile device, wherein the configuring the mobile device according to the first number of the codewords comprises configuring the mobile device with a radio resource control signal associated with the first number of the codewords.

2. The method of claim 1, further comprising:
configuring, by the network device, the mobile device according to the second number of the codewords.

3. The method of claim 2, further comprising:
in response to the configuring the mobile device according to the first number of the codewords, modifying, by the network device, a transport block size based on a parameter associated with a layer of a wireless network.

4. The method of claim 1, wherein the configuring the mobile device according to the first number of the codewords comprises configuring the mobile device according to the radio resource control signal until a radio resource control reconfiguration has been determined to have occurred.

5. The method of claim 1, further comprising:
receiving, by the network device, layer mapping data indicative of a first layer being mapped to a second layer from the mobile device.

6. The method of claim 5, wherein the layer mapping data comprises codeword data associated with the first layer being mapped to the second layer.

7. The method of claim 1, further comprising:
transmitting, by the network device, the first number of the codewords via a downlink control channel between the mobile device and the network device.

8. A system, comprising:
a processor; and
a memory that stores executable instructions that, when executed by the processor, facilitate performance of operations, comprising:
receiving a reference signal associated with channel state data of channel between a mobile device and a network device, wherein the reference signal comprises recommendation data representative of a recommendation for a first number of codewords from the mobile device;
in response to sending signal to noise plus interference ratio comparison data associated with a layer of the channel to the network device, configuring the mobile device in accordance with a second number of codewords;
based on the second number of the codewords, facilitating modifying a transport block, associated with the network device, resulting in a modified transport block; and
configuring the mobile device according the modified transport block and the first number of the codewords different than the second number of codewords, wherein the configuring the mobile device according to the first number of the codewords comprises configuring the mobile device with a radio resource control signal associated with the first number of the codewords.

9. The system of claim 8, wherein the operations further comprise:
transmitting the first number of the codewords via a downlink control channel between the mobile device and the network device.

10. The system of claim 8, wherein the operations further comprise:
based on the channel state data, generating channel estimation data associated with the channel.

11. The system of claim 8, wherein the operations further comprise:
based on channel estimation data associated with the channel, generating the signal to noise plus interference ratio data, representative of a signal to noise plus interference ratio of the layer.

12. The system of claim 8, wherein the operations further comprise:
configuring the mobile device according to the radio resource control signal until a reconfiguration of the mobile device has been determined to have occurred.

13. The system of claim 8, wherein the layer is a first layer, wherein the channel is a first channel, and wherein the signal to noise plus interference ratio comparison data comprises first signal to noise plus interference ratio data, representative of a first signal to noise plus interference ratio of the first layer of the first channel, compared to a second signal to noise plus interference ratio of a second layer between the mobile device and the network device, resulting in the signal to noise plus interference ratio comparison data.

14. The system of claim 8, wherein the layer is a first layer, and wherein the operations further comprise:
facilitating mapping the first layer to a second layer from the mobile device.

15. A non-transitory machine-readable medium, comprising executable instructions that, when executed by a processor, facilitate performance of operations, comprising:
receiving a signal transmission from a mobile device of a wireless network, wherein the signal transmission comprises an indication that the mobile device is configured with a first number of codewords, wherein the signal transmission comprises recommendation data representative of a recommendation for a second number of the codewords from the mobile device; and
in response to analyzing a quality difference metric indicative of the first number of codewords being less than a predefined number associated with a quality difference, facilitating use of a second number of the codewords different from the first number of the codewords, wherein the facilitating the use of the second number of the codewords comprises configuring the mobile device with a radio resource control signal associated with the second number of the codewords.

16. The non-transitory machine-readable medium of claim 15, wherein the quality difference comprises channel quality indicator data.

17. The non-transitory machine-readable medium of claim 15, wherein the operations further comprise:
modifying a transport block associated with a layer of the wireless network.

18. The non-transitory machine-readable medium of claim 15, wherein the operations further comprise:
facilitating decoding of information of a downlink control channel of the wireless network.

19. The non-transitory machine-readable medium of claim 15, wherein the operations further comprise:
facilitating decoding information of a data channel associated with a downlink control channel of the wireless network.

20. The non-transitory machine-readable medium of claim 15, wherein the signal transmission comprises the quality difference metric, and wherein the quality difference metric is indicative of the first number of codewords being less than the predefined number associated with the quality difference.

* * * * *